US012512639B2

(12) United States Patent
Orlowski et al.

(10) Patent No.: US 12,512,639 B2
(45) Date of Patent: Dec. 30, 2025

(54) SYSTEM AND METHOD TO DETERMINE QUALITY OF TERMINATION OF WIRE USING THERMAL CHARACTERISTICS

(71) Applicant: TE Connectivity Solutions GmbH, Schaffhausen (CH)

(72) Inventors: Matthew Orlowski, Harrisburg, PA (US); Eric Broadaway, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 446 days.

(21) Appl. No.: 18/300,476

(22) Filed: Apr. 14, 2023

(65) Prior Publication Data

US 2024/0347993 A1 Oct. 17, 2024

(51) Int. Cl.

*H01R 43/00* (2006.01)
*H01R 43/02* (2006.01)
*H01R 43/042* (2006.01)
*H01R 43/048* (2006.01)

(52) U.S. Cl.

CPC ....... *H01R 43/048* (2013.01); *H01R 43/0214* (2013.01); *H01R 43/042* (2013.01)

(58) Field of Classification Search

CPC . H01R 43/0214; H01R 43/042; H01R 43/048
See application file for complete search history.

(56) References Cited

U.S. PATENT DOCUMENTS 5,197,186 A * 3/1993 Strong .................... B30B 15/14 29/748
5,678,300 A * 10/1997 Saur ................... G05D 23/1921 29/613
11,527,860 B2 12/2022 Dubler et al.
2007/0131233 A1 * 6/2007 Degliesposti ........... B65B 19/28 53/461
2021/0119397 A1 4/2021 Dubler et al.
2022/0044847 A1 * 2/2022 Houser .............. H01B 13/0016
2023/0025454 A1 1/2023 Dubler et al.
2023/0411916 A1 12/2023 Wesseler et al.

FOREIGN PATENT DOCUMENTS

CN 105633759 A 6/2016

OTHER PUBLICATIONS

International Search Report, PCT/IB2024/053314 International Filing Date Apr. 4, 2024.

* cited by examiner

*Primary Examiner* — Phuong Chi Thi Nguyen

(57) ABSTRACT

A wire terminating system and method which allows for determining the quality of a wire termination. The method includes: terminating the terminal to the wire; monitoring the thermal data of the termination of the terminal to the wire with one or more thermal sensors; and comparing the monitored thermal data to stored thermal data to determine if the termination of the terminal to the wire is defective. The system includes a wire termination apparatus with a thermal sensor is positioned proximate a wire termination zone to acquire thermal data of the termination of the terminal to the wire. The thermal sensor monitors the thermal data of the termination of the terminal to the wire to determine if the termination of the terminal to the wire is defective.

24 Claims, 7 Drawing Sheets

SYSTEM AND METHOD TO DETERMINE QUALITY OF TERMINATION OF WIRE USING THERMAL CHARACTERISTICS

FIELD OF THE INVENTION

The invention relates to a method and system for monitoring the quality of a termination of a wire using thermal characteristics of the termination.

BACKGROUND OF THE INVENTION

Wires are terminated using a variety of methods, such as, crimping, soldering or welding. For example, electrical terminals are typically crimped onto wires by a crimping apparatus to form a lead. The crimping apparatus may be a stationary apparatus or a hand tool. In operation, the terminal is placed in a fixed part of the stationary apparatus or the hand tool and an end of a wire is inserted into a ferrule or barrel of the terminal. A ram of the tooling is caused to move toward the fixed part through a crimp stroke, thereby crimping the terminal onto the wire.

Systems have been developed that monitor the quality of the crimps. When a defective crimp is detected, the lead is discarded. Some known crimp quality monitoring systems measure crimp quality by measuring crimp height. Ordinarily, if a terminal is not crimped to the correct crimp height for the particular terminal and wire combination, an unsatisfactory crimp connection will result. However, many unsatisfactorily crimp connections will, nevertheless, exhibit a "correct" crimp height. As such, systems that monitor crimp quality based on crimp height may pass defective leads from the crimping apparatus. Additionally, a crimp height variance or other physical variation in the crimped terminal is not, in and of itself, the cause of a defective crimp connection, but rather, may be indicative of another factor which causes the poor connection. Such factors include using the wrong terminal or wire size, missing strands of wire, short brush, insulation in the crimp, abnormal position of the terminal, wrong wire type, incorrect stripping of insulation and the like. Such defective crimp connections frequently have the appearance of high-quality crimp connections, and therefore, pass inspection.

Other known crimp quality monitoring systems detect a defectively crimped terminal by analyzing the crimping forces imposed on the terminal during the actual crimping operation. For example, the systems collect force and displacement data during the crimp stroke and compare that data with normalized data collected from known good crimps during a learning phase. Such comparison is utilized to determine whether a particular crimp meets acceptable standards. However, crimp quality monitoring systems that monitor crimp quality based on force profiles are not without problems. The systems are inaccurate at measuring certain types of defective crimps. For example, the systems are susceptible to incorrectly identifying crimps having insulation in the barrel as being good crimps. The systems also are susceptible to falsely identifying some good crimps as being defective. In addition, with various materials, such as aluminum wire, there is very little force variation between crimping a terminal with the aluminum wire properly inserted and crimping a terminal with no aluminum wire inserted. Consequently, measuring the force to determine if the crimp is proper is not effective.

In addition, measuring the crimp quality of a crimped terminal is difficult when the crimp is performed by a hand tool. Because of the size, portability and nature of the hand tool, it is difficult to provide sufficient monitoring equipment or sensors to properly monitory the crimp quality.

A need remains for not only a crimp quality monitoring system, but generally a wire termination quality monitoring system, that may be used to accurately monitor wire termination quality for all types of wires and for different types of terminations, whether such terminations are done by a stationary apparatus or a hand tool.

It would, therefore, be beneficial to provide a wire termination monitoring system and method which can be used to monitor different terminations of wires, regardless of the apparatus used to effect the wire termination. In particular, it would be beneficial to provide a wire termination monitoring system and method which does not solely measure force or dimensions, but monitors the thermal characteristics of the termination.

SUMMARY OF THE INVENTION

The following provides a summary of certain illustrative embodiments of the present invention. This summary is not an extensive overview and is not intended to identify key or critical aspects or elements of the present invention or to delineate its scope.

An embodiment is directed to a method of determining the quality of a termination of a terminal to a wire. The method includes: positioning the terminal in a wire termination zone of a wire termination apparatus; positioning the wire in the wire termination zone of the wire termination apparatus; terminating the terminal to the wire; monitoring the thermal data of the termination of the terminal to the wire with one or more thermal sensors; and comparing the monitored thermal data to stored thermal data to determine if the termination of the terminal to the wire is defective. If the termination of the terminal to the wire is defective, the wire is discarded.

An embodiment is directed to a wire termination system which allows for determining the quality of a termination of a terminal to a wire. The wire termination system includes a wire termination apparatus with a wire termination zone. A thermal sensor is positioned proximate the wire termination zone to acquire thermal data of the termination of the terminal to the wire. The thermal sensor monitors the thermal data of the termination of the terminal to the wire to determine if the termination of the terminal to the wire is defective.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention.

DETAILED DESCRIPTION OF THE INVENTION

Figure 1:
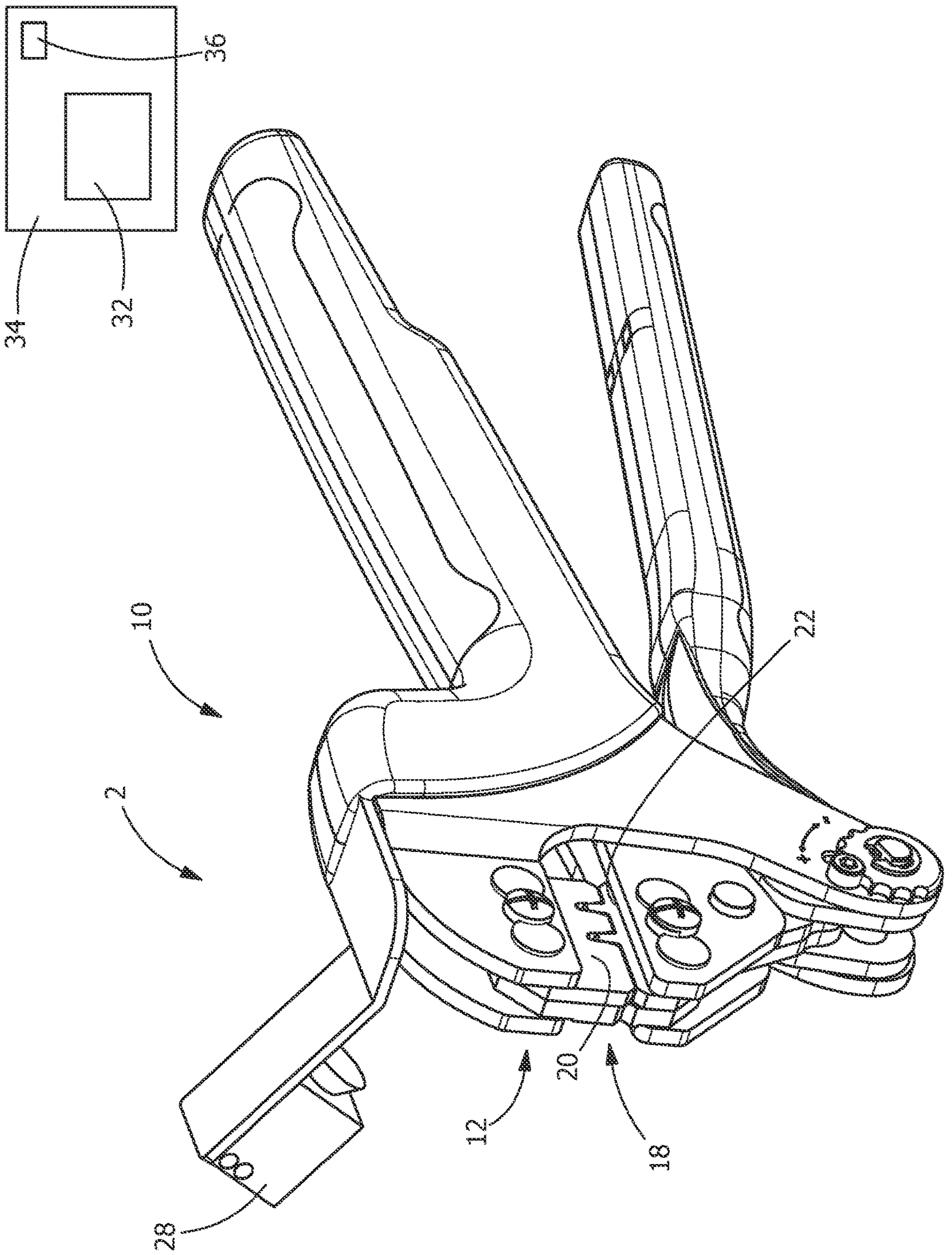
FIG. 1 is a perspective view of a first illustrative wire termination system having a hand-held wire termination apparatus having thermal sensors positioned thereon to monitor the quality of a termination of a terminal to a wire.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Illustrative wire termination systems 2, 102, 202 with wire terminating devices or apparatuses 10, 110, 210 and method of monitoring the wire termination process 300, 400 for the purpose of determining the termination quality by using thermal characteristics and signatures are shown.

Figure 7:
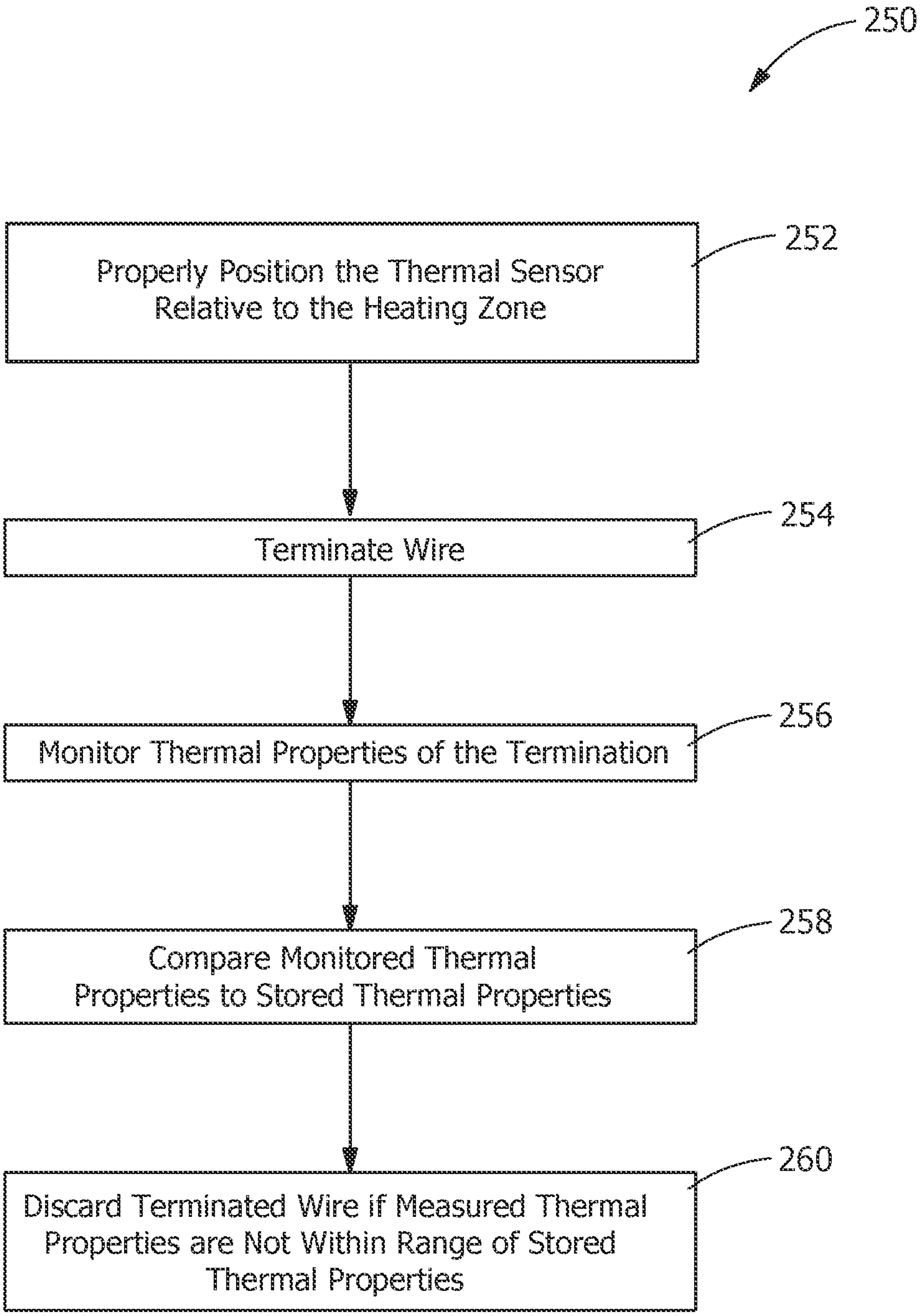
FIG. 7 is a flowchart illustrating an illustrative method of monitoring the quality of the termination of the terminal to the wire of FIG. 6 using thermal properties.

FIGS. 1-2 and 4-5 illustrate crimping apparatus 10. 110 which uses thermal characteristics and signatures to determine the quality of the crimp termination. FIGS. 7-8 illustrate a heating apparatus 210, such as, but not limited to an apparatus for heat shrink, which uses thermal characteristics and signatures to determine the quality of the heated termination. However, the use of the crimping apparatus 10, 110 and the heating apparatus 210 are meant to be illustrative and not limiting. The use of thermal data and analysis, as described below, to monitor the termination of wires, conductors or terminals has other uses beyond just crimp and heated termination related applications. For example, apparatus such as an insulation displacement connector (IDC) apparatus, a welding apparatus, and the like, that attach connectors or terminals to wires using processes other than crimping or heat shrink may be used. Alternatively, the crimping apparatus 10, 110 may be another type of crimping apparatus such as a lead frame apparatus.

Figure 2:
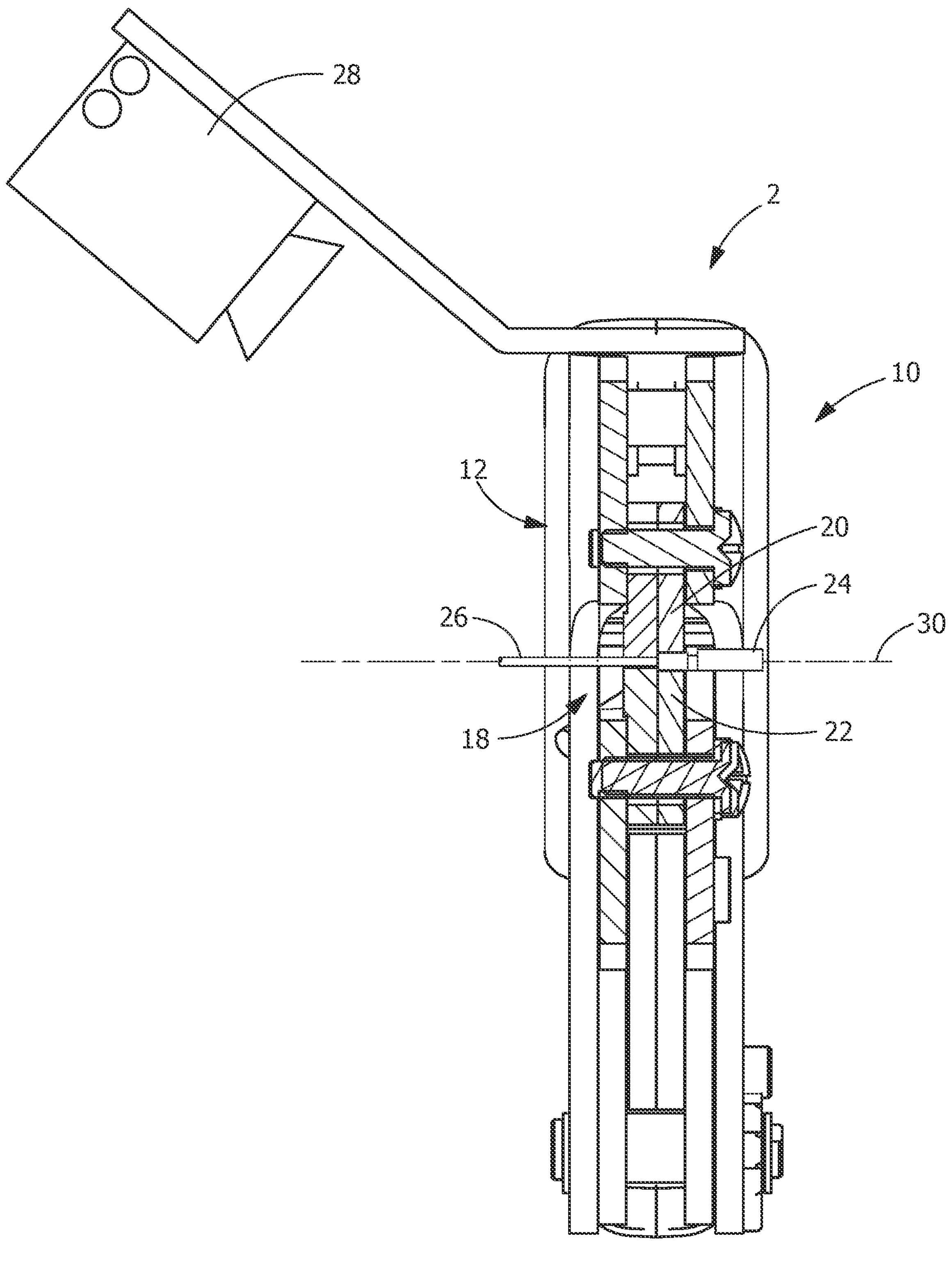
FIG. 2 is an end view of the illustrative hand-held wire termination apparatus of FIG. 1, taken along line 2-2 of FIG. 1.

Referring to FIGS. 1 and 2, an applicator 12 is coupled to the crimping apparatus 10. In the embodiment shown, the crimping apparatus 10 is hand-held wire termination apparatus or tool which can be used in multiple locations. The applicator 12 may be removed and replaced with a different applicator, such as when the applicator 12 is worn or damaged or when an applicator having a different configuration is desired. The applicator 12 has a wire termination zone or crimping zone 18 and includes a first crimping head 20 and a second crimping head 22 as the mechanical tooling for crimping electrical connectors or terminals 24 to an end of a wire 26 in the crimping zone 18. The second crimping head 22 may be a stationary component of the applicator 12, and the first crimping head 20 may be a movable component. Alternatively, the second crimping head 22 and the first crimping head 20 may both be movable. The crimping apparatus 10 shown and described is illustrative, as the crimping apparatus may have different configurations.

One or more sensors 28 are mounted to the crimping apparatus 10. The sensors 28 may include a thermal sensor, a visual sensor or both. Additional types of sensors may be included in the sensors 28. Alternatively, one sensor 28 may be a thermal sensor, which another sensor 28, which is remote from the thermal sensor may be a visual sensor. The sensors 28 may be mounted at various locations in or proximate to the crimping zone 18. The sensors 28 may be removably mounted by a removable device, such as, but not limited to, a magnet (not shown). Alternatively, the sensors 28 may be held in place by using mechanical fasteners, latches, adhesives, and the like. The shape and positioning of sensors 28 is meant to be illustrative, as the thermal sensors may have other configurations and may be positioned as other locations.

In the embodiment shown in FIGS. 1 and 2, the sensor 28 is a thermal sensor 28 is positioned to have a field of view that includes the crimping zone 18. The thermal sensor 28 is positioned to acquire the thermal characteristics, in the form of discrete thermal data, of the terminal 24 and/or the wire 26 in the crimping zone 18. In an illustrative embodiment, the thermal sensor 28 is positioned in-line with a longitudinal axis 30 of the terminal 24. This allows the thermal sensor 28 to directly sense and collect the thermal data from the thermal energy that is emitted directly from the terminal 24 and/or the wire 26. In an alternate embodiment, the thermal sensor 28 may be positioned out-of-line or off-center from the axis 30. If the sensor 28 is positioned out-of-line or off-center from the axis 30, the thermal sensor 28 may collect thermal energy that is transferred through the terminal 24 to the wire 26 or to another object and/or the thermal sensor 28 may collect thermal energy which is reflected off the terminal 24 and/or the wire 26. In various illustrative embodiments, more than one thermal sensor 28 may be provided.

In various illustrative embodiments, the applicator may have projections positioned proximate the crimping zone 18 and the terminal 24 and/or the wire 26 which are configured to intentionally reflect or direct thermal energy from the terminal 24 and/or the wire 26 being sensed. This allows a thermal sensor 28 which is out-of-line or off-center from the terminal 24 to read thermal data that is reflected from the projections. The projections may be made of materials of known emissivity to enhance the reflected imaging of the thermal characteristics of the terminal 24 and/or the wire 26 being terminated. This would allow the ability to thermally "sense" areas that would not be easy viewed or to view more surface area of the terminal 24 and/or the wire 26.

As previously stated, the thermal data collected by the thermal sensors 28 may be one or a combination of three distinct components of energy. The first is thermal energy emitted directly from the terminal 24 and/or the wire 26. The second is thermal energy that is transferred through the object (heat from somewhere else that passes through) such as from the terminal 24 to the wire 26. The third is thermal energy reflected off the terminal 24 and/or the wire 26.

In one exemplary embodiment, the thermal data is captured by a plurality of sensors 28 arranged in a matrix (such as a charge coupled device network) which allows the thermal data to be captured and arranged in rows and columns—similar to how pixels of data describe a visual image collected with a conventional visual energy camera. For example, one thermal sensor may be positioned in-line with the longitudinal axis of the of the terminal, while other thermal sensors of the matrix may be positioned out-of-line or off-center from the axis. Due to the number of data points, techniques, such as but not limited to, an adapted convolution neural network, are used to extract features from these matrices of data to analyze the process of a crimp before, during and after the crimp has been formed. These features are apparent in particular regions of interest on the terminal 24 and/or the wire 26 and form the basis of categorization of the termination.

The characteristics and signatures of the thermal data collect may include, but are not limited to: i) area heating; ii) heat transfer times; iii) heat transfer patterns; iv) temperature delta v) physical characteristics and variations identified through thermal properties.

In addition, the thermal data can be collected at various rates, which results in a time series of images. Using analysis techniques, such as, but not limited to artificial intelligence, the time varying data can be analyzed.

In various illustrative examples, the thermal sensors 28 have the ability to collect absolute temperatures. Absolute temperatures provide the potential for not just analyzing "relative" regions of interest but potentially distinct mechanical characteristics of the termination.

A display device 32 may be communicatively coupled to the thermal sensor 28 and configured to display the thermal characteristics acquired by the thermal sensor 28. The display device 32 may be integrated into a host controller or processor of the crimping apparatus 10 or the thermal sensor 28 itself or may be a separate controller or processor 34, such as a desktop computer, a laptop computer, a tablet computer, a monitor, a projector, heads-up display glasses and the like. Optionally, the display device 32 may be a crimp quality monitor (CQM) device. The controller 34 and/or display device 32 may be coupled to the thermal sensor 28 through a cable or the like. Alternatively, the controller 34 and/or display device 32 may communicate wirelessly through induction, radio frequency waves, Wi-Fi, and the like to transmit data between the thermal sensor 28 and the controller 34 and/or display device 32.

The controller 34 and/or display device 32 may include a storage or memory device 36 such as, but not limited to, a hard disk drive, RAM, ROM, and/or another internal data storage device. The memory device 36 may be configured to store data acquired by the thermal sensor 28. Such data may be used for subsequent quality reporting purposes.

In various illustrative embodiments, the crimping apparatus 10 may include additional sensors (not shown), such as, but not limited to, a force sensor or a linear sensor to provide additional data with respect to the quality of the crimp.

Figure 3:
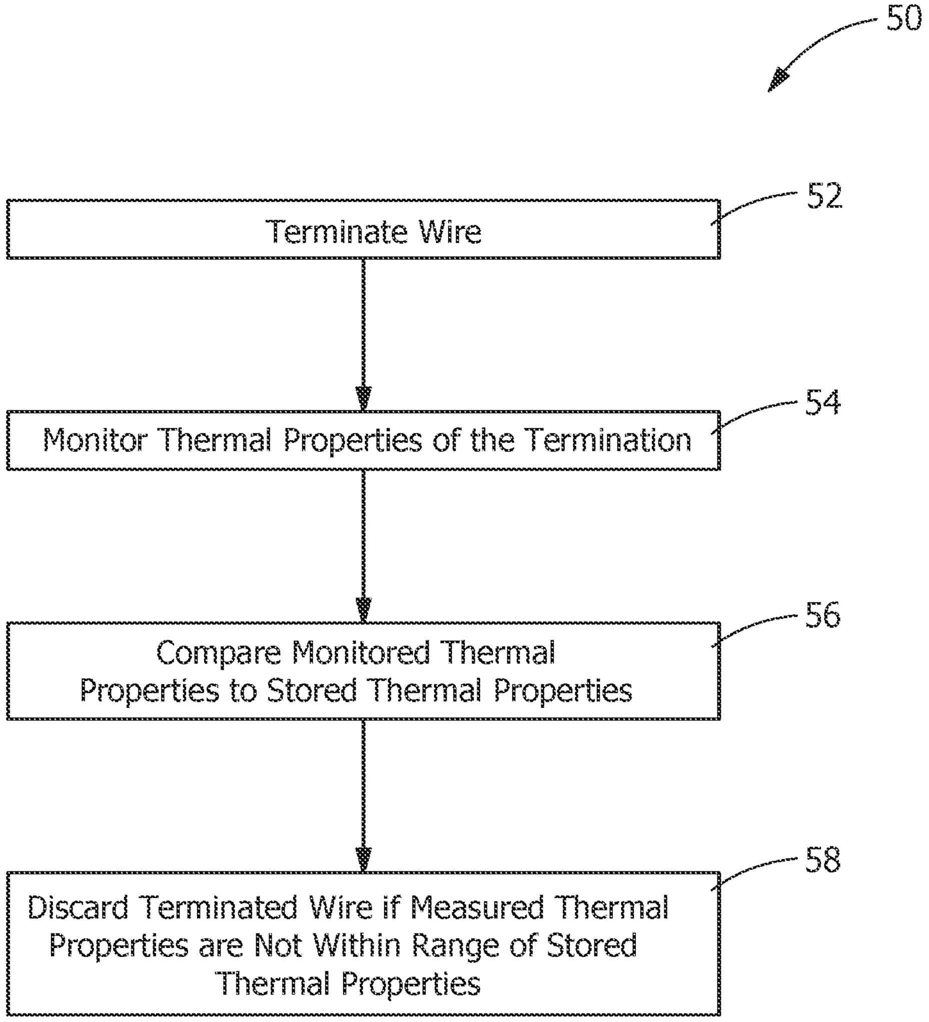
FIG. 3 is a flowchart illustrating an illustrative method of monitoring the quality of the termination of the terminal to the wire of FIG. 1 using thermal properties.

FIG. 3 illustrates the method 50 of determining the quality of a termination. During a crimping operation, the first crimping head 20 and the second crimping head 22 of the crimping apparatus 10 is driven toward each other and finally away from each other, thereby terminating the terminal 24 to the wire 26 as represented by 52 in FIG. 3.

The crimping of the terminal 24 to the wire 26 occurs as the first crimping head 20 and the second crimping head 22 are moved toward each other. The first crimping head 20 and the second crimping head 22 engage the terminal 24 and crimps the terminal 24 onto the wire 26 by compressing the terminal 24 between the first crimping head 20 and the second crimping head 22. As this occurs, thermal energy or heat is produced in the terminals 24 and the wires 26 within and proximate to the crimp.

As previously stated, the thermal sensor 28, either directly from thermal sensor 28 positioned in line with the axis 30 or indirectly from thermal sensor 28 positioned out-of-line or off-center from the axis 30, may acquire temperature measurements/data at designated intervals or continuously of the terminals 24 and the end of the wire 26 positioned in the crimping zone 18. The collected temperature measurements/data is transmitted to the display device 32, the controller 34 or the memory device 36, either on the crimping apparatus 10 or at an external location from the crimping apparatus 10. The temperature measurements/data transmitted by the thermal sensor 28 is used by an operator of the crimping apparatus 10 to be able to determine if the termination of the wire meets appropriate standards to provide the desired electrical and mechanical connection. The terms "operator" is used herein to identify the apparatus or person operating or controlling the crimping apparatus 10.

By monitoring the temperature of the terminal 24, either directly or indirectly, the quality of the termination may be monitored. By analyzing the temperature of the terminal 24, either directly or indirectly, other characteristics of the termination may be analyzed. For example, the temperature may be used to calculate the forces imported onto the terminal 24, as the amount of force is related to the temperature of the terminal 24 after termination has occurred.

In an exemplary embodiment, as represented by 54 in FIG. 3, the thermal characteristics of the termination are measured, either directly or indirectly, during the termination process by the one or more thermal sensors 28. The thermal characteristics are measured at predetermined intervals based on either time or tooling position. For example, a predetermined sample time may be selected, and the thermal characteristics may be measured at each of the discrete sample times. Alternatively, or additionally, the thermal characteristics may be measured when the crimp tooling is at a predetermined crimp height position. The position of the crimp tooling may be detected by a distance sensor (not shown) or the like.

The controller 34 may create a measured temperature profile of the termination based on the measured thermal characteristics. The measured thermal profile is then compared to an acceptable temperature profile or an acceptable temperature profile range of known successful termination, as represented by 56 in FIG. 3. Alternatively, the measured thermal characteristics may be compared to known acceptable temperature characteristics or profiles of the particular materials being used. The acceptable temperature profile or an acceptable temperature profile range may be preinstalled in the controller 34 or may be developed by the user on-site and stored in the controller 34. If the measured temperature profile is within the acceptable temperature profile range, the controller 34 will indicate that the termination is proper. If the measured temperature profile is not within the acceptable temperature profile range, the controller 34 will indicate that the termination is not acceptable and reject the termination, as represented by 58 in FIG. 3. Data relating to the thermal characteristics, the peak temperature, the amount of area below the temperature curve, the shape of the temperature curve, or any combination may be analyzed to determine if the termination is defective.

Figure 4:
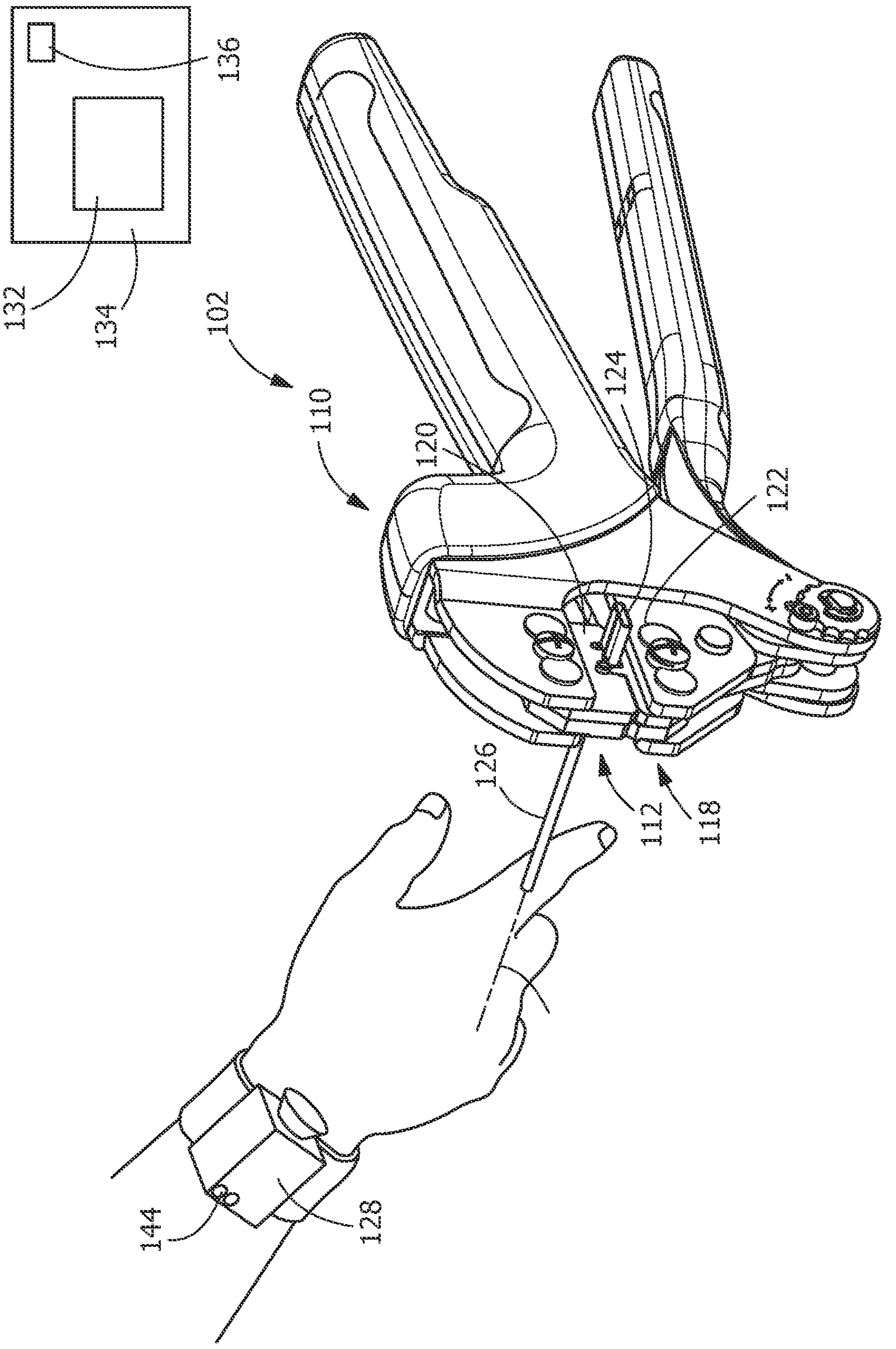
FIG. 4 is a perspective view of a second illustrative wire termination system having an illustrative wire termination apparatus and illustrative thermal sensors positioned proximate the wire termination apparatus to monitor the quality of a termination of a terminal to a wire, the illustrative wire termination apparatus being a crimping apparatus.

Referring to FIG. 4, an applicator 112 is coupled to the crimping apparatus 110. In the embodiment shown, the crimping apparatus 110 is a hand-held wire termination apparatus or tool which can be used in multiple locations. The applicator 112 may be removed and replaced with a different applicator, such as when the applicator 112 is worn or damaged or when an applicator having a different configuration is desired. The applicator 112 has a wire termination zone or crimping zone 118 and includes a first crimping head 120 and a second crimping head 122 as the mechanical tooling for crimping electrical connectors or terminals 124 to an end of a wire 126 in the crimping zone 118. The second crimping head 122 may be a stationary component of the applicator 112, and the first crimping head 120 may be a movable component. Alternatively, the second crimping head 122 and the first crimping head 120 may both be movable. The crimping apparatus 110 shown and described is illustrative, as the crimping apparatus may have different configurations.

One or more sensors 128 are positioned proximate to, but removed from the crimping apparatus 110. The sensors 128 may include a thermal sensor, a visual sensor or both. Additional types of sensors may be included in the sensors 128. Alternatively, one sensor 128 may be a thermal sensor, which another sensor 28, which is remote from the thermal sensor may be a visual sensor.

In the illustrative embodiment shown in FIG. 4, the sensor 128 is a one thermal sensor 128 is positioned on a wearable device on a wrist of an operator. However, the thermal sensor 128 may be mounted on other types of wearable devices or in other locations proximate to the crimping apparatus 110. The shape and positioning of thermal sensors 128 is meant to be illustrative, as the thermal sensors may have other configurations and may be positioned as other locations.

The thermal sensor 128 is positioned to have a field of view that includes the crimping zone 118. In order to facilitate the positioning of the thermal sensor 128 may have a positioning or calibration device 144 to provide guidance as to the proper positioning of the one or more thermal sensors 128 relative the wire termination or crimping apparatus 110 and to indicate whether the thermal sensor 128 is properly positioned relative to the crimping zone 118. The positioning device may be provided on the thermal sensor 128 or remote from the thermal sensor 128. the positioning device provides guidance as to the proper positioning of the one or more thermal sensors relative the wire termination zone of the wire termination apparatus The thermal sensor 128 is positioned to acquire the thermal characteristics, in the form of discrete thermal data, of the terminal 124 and/or the wire 126 in the crimping zone 118. The thermal sensor 128 may be positioned in-line with a longitudinal axis 130 of the terminal 124 to allow the thermal sensor 128 to directly sense and collect the thermal data from the thermal energy that is emitted directly from the terminal 124 and/or the wire 126. Alternatively, the thermal sensor 128 may be positioned out-of-line or off-center from the axis 130, allowing the thermal sensor 128 to collect thermal energy that is transferred through the terminal 124 to the wire 126 or to another object and/or to collect thermal energy which is reflected off the terminal 124 and/or the wire 126. In various illustrative embodiments, more than one thermal sensor 128 may be provided.

In various illustrative embodiments, the applicator may have projections positioned proximate the crimping zone 118 and the terminal 124 and/or the wire 126 which are configured to intentionally reflect or direct thermal energy from the terminal 124 and/or the wire 126 being sensed. This allows a thermal sensor 128 which is out-of-line or off-center from the terminal 124 to read thermal data that is reflected from the projections. The projections may be made of materials of known emissivity to enhance the reflected imaging of the thermal characteristics of the terminal 124 and/or the wire 126 being terminated. This would allow the ability to thermally "sense" areas that would not be easy viewed or to view more surface area of the terminal 124 and/or the wire 126.

As previously stated, the thermal data collected by the thermal sensors 128 may be one or a combination of three distinct components of energy. The first is thermal energy emitted directly from the terminal 124 and/or the wire 126. The second is thermal energy that is transferred through the object (heat from somewhere else that passes through) such as from the terminal 124 to the wire 126. The third is thermal energy reflected off the terminal 124 and/or the wire 126.

The number and positioning of the thermal sensors and the characteristics of the thermal data are similar to that described with respect to the embodiment shown in FIGS. 1 and 2.

A display device 132 may be communicatively coupled to the thermal sensor 128 and configured to display the thermal characteristics acquired by the thermal sensor 128. The display device 132 may be integrated into a host controller or processor of the crimping apparatus 110 or the thermal sensor 128 itself or may be a separate controller or processor 134, such as a desktop computer, a laptop computer, a tablet computer, a monitor, a projector, heads-up display glasses and the like. Optionally, the display device 132 may be a crimp quality monitor (CQM) device. The controller 134 and/or display device 132 may be coupled to the thermal sensor 128 through a cable or the like. Alternatively, the controller 134 and/or display device 132 may communicate wirelessly through induction, radio frequency waves, Wi-Fi, and the like to transmit data between the thermal sensor 128 and the controller 134 and/or display device 132.

The controller 134 and/or display device 132 may include a storage or memory device 136 such as, but not limited to, a hard disk drive, RAM, ROM, and/or another internal data storage device. The memory device 136 may be configured to store data acquired by the thermal sensor 128. Such data may be used for subsequent quality reporting purposes.

In various illustrative embodiments, the crimping apparatus 110 may include additional sensors (not shown), such as, but not limited to, a force sensor or a linear sensor to provide additional data with respect to the quality of the crimp.

Figure 5:
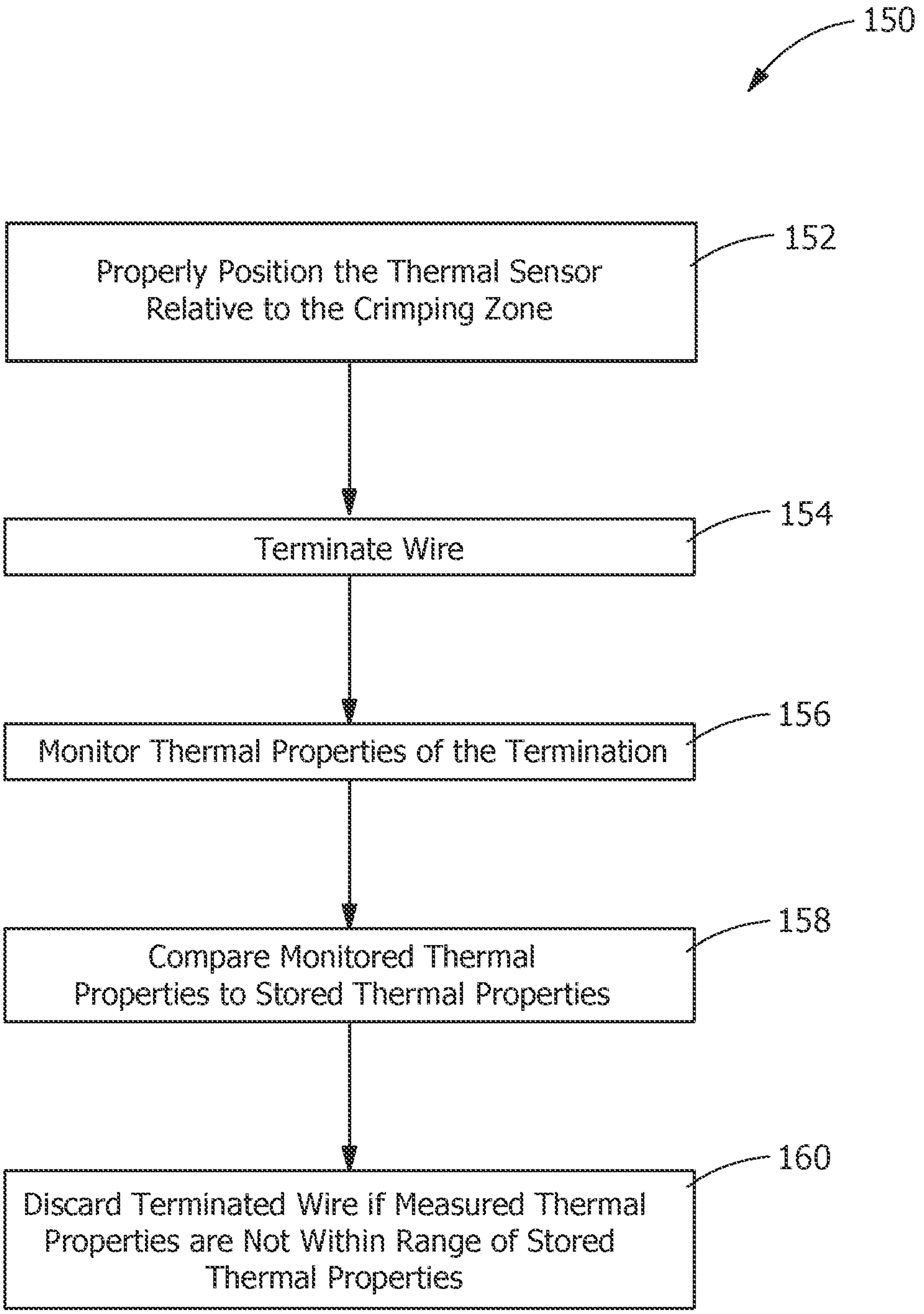
FIG. 5 is a flowchart illustrating an illustrative method of monitoring the quality of the termination of the terminal to the wire of FIG. 4 using thermal properties.

FIG. 5 illustrates the method 150 of determining the quality of a termination using a remote thermal sensor 128. During a crimping operation, the thermal sensor 128 is properly positioned relative to the crimping zone 118, as represented by 152 in FIG. 5, to allow the thermal sensor 128 to take proper measurements as crimping occurs. The first crimping head 120 and the second crimping head 122 of the crimping apparatus 110 are then driven toward each other and finally away from each other, thereby terminating the terminal 124 to the wire 126 as represented by 154 in FIG. 5.

The crimping of the terminal 124 to the wire 126 occurs as the first crimping head 120 and the second crimping head 122 are moved toward each other. The first crimping head 120 and the second crimping head 122 engage the terminal 124 and crimps the terminal 124 onto the wire 126 by compressing the terminal 124 between the first crimping head 120 and the second crimping head 122. As this occurs, thermal energy or heat is produced in the terminals 124 and the wires 126 within and proximate to the crimp.

As previously stated, the thermal sensor 128, either directly from thermal sensor 128 positioned in line with the axis 130 or indirectly from thermal sensor 128 positioned out-of-line or off-center from the axis 130, may acquire temperature measurements/data at designated intervals or continuously of the terminals 124 and the end of the wire 126 positioned in the crimping zone 118. The collected temperature measurements/data is transmitted to the display device 132, the controller 134 or the memory device 136, either on the crimping apparatus 110 or at an external location from the crimping apparatus 110. The temperature measurements/data transmitted by the thermal sensor 128 is used by an operator of the crimping apparatus 110 to be able to determine if the termination of the wire meets appropriate standards to provide the desired electrical and mechanical connection.

By monitoring the temperature of the terminal 124, either directly or indirectly, the quality of the termination may be monitored. By analyzing the temperature of the terminal 124, either directly or indirectly, other characteristics of the termination may be analyzed. For example, the temperature may be used to calculate the forces imported onto the terminal 124, as the amount of force is related to the temperature of the terminal 124 after termination has occurred.

In an exemplary embodiment, as represented by 156 in FIG. 5, the thermal characteristics of the termination are measured, either directly or indirectly, during the termination process by the one or more thermal sensors 128. The thermal characteristics are measured at predetermined intervals based on either time or tooling position. For example, a predetermined sample time may be selected, and the thermal characteristics may be measured at each of the discrete sample times. Alternatively, or additionally, the thermal characteristics may be measured when the crimp tooling is at a predetermined crimp height position. The position of the crimp tooling may be detected by a distance sensor (not shown) or the like.

The controller 134 may create a measured temperature profile of the termination based on the measured thermal characteristics. The measured thermal profile is then compared to an acceptable temperature profile or an acceptable temperature profile range of known successful termination, as represented by 158 in FIG. 5. Alternatively, the measured thermal characteristics may be compared to known acceptable temperature characteristics or profiles of the particular materials being used. The acceptable temperature profile or an acceptable temperature profile range may be preinstalled in the controller 134 or may be developed by the user on-site and stored in the controller 134. If the measured temperature profile is within the acceptable temperature profile range, the controller 134 will indicate that the termination is proper. If the measured temperature profile is not within the acceptable temperature profile range, the controller 134 will indicate that the termination is not acceptable and reject the termination, as represented by 160 in FIG. 5. Data relating to the thermal characteristics, the peak temperature, the amount of area below the temperature curve, the shape of the temperature curve, or any combination may be analyzed to determine if the termination is defective.

Figure 6:
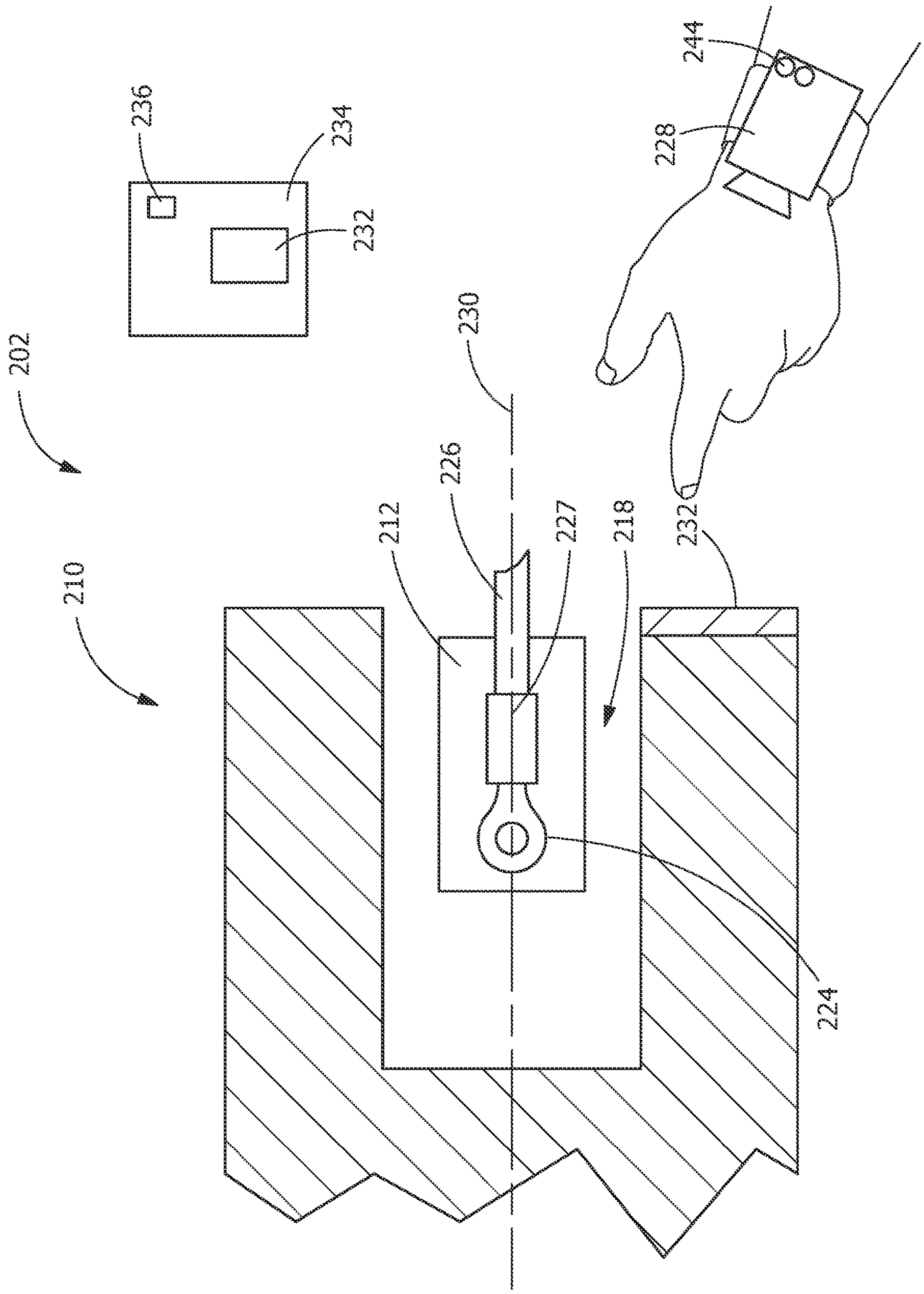
FIG. 6 is a perspective view of a third illustrative wire termination system having an illustrative wire termination apparatus and illustrative thermal sensors positioned proximate the wire termination apparatus to monitor the quality of a termination of a terminal to a wire, the illustrative wire termination apparatus being a heating apparatus.

Referring to FIG. 6, the wire termination system 202 includes a heating apparatus 210. The heating apparatus 210 has a heating element 212 in a wire termination zone or heating zone 218. The heating apparatus 210 is used for terminating and sealing connectors or terminals 224 to wires 226. However, other types of apparatuses may be used, such as an insulation displacement connector (IDC) apparatus, a welding apparatus, and the like, that attach connectors or terminals to wires using processes other than crimping or heat shrink.

One or more thermal sensors 228 are positioned proximate to, but removed from the heating apparatus 210. In the illustrative embodiment shown, one thermal sensor 228 is positioned on a wearable device on a wrist of an operator. However, the thermal sensor 228 may be mounted on other types of wearable devices or in other locations proximate to the heating apparatus 210. The shape and positioning of thermal sensors 228 is meant to be illustrative, as the thermal sensors may have other configurations and may be positioned as other locations.

The thermal sensor 228 is positioned to have a field of view that includes the heating zone 218. In order to facilitate the positioning of the thermal sensor 228 may have a positioning or calibration device 244 to provide guidance as to the proper positioning of the one or more thermal sensors 228 relative the wire termination or crimping apparatus 210 and to indicate whether the thermal sensor 228 is properly positioned relative to the heating zone 218. The positioning device may be provided on the thermal sensor 228 or remote from the thermal sensor 228.

The thermal sensor 228 is positioned to acquire the thermal characteristics, in the form of discrete thermal data, of the terminal 224 and/or the wire 226 in the heating zone 218. The thermal sensor 228 may be positioned in-line with a longitudinal axis 230 of the terminal 224 and/or the heat shrink wrap 227 to allow the thermal sensor 228 to directly sense and collect the thermal data from the thermal energy that is emitted directly from the terminal 224 and/or the wire 226. Alternatively, the thermal sensor 228 may be positioned out-of-line or off-center from the axis 230, allowing the thermal sensor 228 to collect thermal energy that is transferred through the terminal 224 to the wire 226 or to another object and/or to collect thermal energy which is reflected off the terminal 224 and/or the wire 226. In various illustrative embodiments, more than one thermal sensor 228 may be provided.

In various illustrative embodiments, the heating apparatus 210 may have projections positioned proximate the heating zone 218 and the terminal 224 and/or the wire 226 which are configured to intentionally reflect or direct thermal energy from the terminal 224 and/or the wire 226 being sensed. This allows a thermal sensor 228 which is out-of-line or off-center from the terminal 224 to read thermal data that is reflected from the projections. The projections may be made of materials of known emissivity to enhance the reflected imaging of the thermal characteristics of the terminal 224 and/or the wire 226 being terminated.

As previously stated, the thermal data collected by the thermal sensors 228 may be one or a combination of three distinct components of energy. The first is thermal energy emitted directly from the terminal 224 and/or the wire 226. The second is thermal energy that is transferred through the object (heat from somewhere else that passes through) such as from the terminal 224 to the wire 226. The third is thermal energy reflected off the terminal 224 and/or the wire 226.

The number and positioning of the thermal sensors and the characteristics of the thermal data are similar to that described with respect to the embodiment shown in FIGS. 1 and 2.

A display device 232 may be communicatively coupled to the thermal sensor 228 and configured to display the thermal characteristics acquired by the thermal sensor 228. The display device 232 may be integrated into a host controller or processor of the heating apparatus 210 or the thermal sensor 128 itself or may be a separate controller or processor 234, such as a desktop computer, a laptop computer, a tablet computer, a monitor, a projector, heads-up display glasses and the like. The controller 234 and/or display device 232 may be coupled to the thermal sensor 228 through a cable or the like. Alternatively, the controller 234 and/or display device 232 may communicate wirelessly through induction, radio frequency waves, Wi-Fi, and the like to transmit data between the thermal sensor 228 and the controller 234 and/or display device 232.

The controller 234 and/or display device 232 may include a storage or memory device 236 such as, but not limited to, a hard disk drive, RAM, ROM, and/or another internal data storage device. The memory device 236 may be configured to store data acquired by the thermal sensor 228. Such data may be used for subsequent quality reporting purposes.

FIG. 7 illustrates the method 250 of determining the quality of a termination using a remote thermal sensor 228. During a heating operation, the thermal sensor 228 is properly positioned relative to the heating zone 218, as represented by 252 in FIG. 7, to allow the thermal sensor 228 to take proper measurements as heating occurs. Hearing then is initiated, thereby terminating the terminal 224 to the wire 226 as represented by 254 in FIG. 7. As this occurs, thermal energy or heat is produced in the terminals 224 and the wires 226 within and proximate to the termination.

As previously stated, the thermal sensor 228, either directly from thermal sensor 228 positioned in line with the axis 230 or indirectly from thermal sensor 228 positioned out-of-line or off-center from the axis 230, may acquire temperature measurements/data at designated intervals or continuously of the terminals 224 and the end of the wire 226 positioned in the heating zone 218. The collected temperature measurements/data is transmitted to the display device 232, the controller 234 or the memory device 236, either on the heating apparatus 210 or at an external location from the heating apparatus 210. The temperature measurements/data transmitted by the thermal sensor 228 is used by an operator of the heating apparatus 210 to be able to determine if the termination of the wire meets appropriate standards to provide the desired electrical and mechanical connection. By monitoring the temperature of the terminal 224, either directly or indirectly, the quality of the termination may be monitored.

In an exemplary embodiment, as represented by 256 in FIG. 7, the thermal characteristics of the termination are measured, either directly or indirectly, during the termination process by the one or more thermal sensors 228. The thermal characteristics are measured at predetermined intervals based on either time or tooling position. For example, a predetermined sample time may be selected, and the thermal characteristics may be measured at each of the discrete sample times. Alternatively, or additionally, the thermal characteristics may be measured when the heating tooling is at a predetermined temperature.

The controller 234 may create a measured temperature profile of the termination based on the measured thermal characteristics. The measured thermal profile is then compared to an acceptable temperature profile or an acceptable temperature profile range of known successful termination, as represented by 258 in FIG. 7. Alternatively, the measured thermal characteristics may be compared to known acceptable temperature characteristics or profiles of the particular materials being used. The acceptable temperature profile or an acceptable temperature profile range may be preinstalled in the controller 234 or may be developed by the user on-site and stored in the controller 234. If the measured temperature profile is within the acceptable temperature profile range, the controller 234 will indicate that the termination is proper. If the measured temperature profile is not within the acceptable temperature profile range, the controller 234 will indicate that the termination is not acceptable and reject the termination, as represented by 260 in FIG. 5. Data relating to the thermal characteristics, the peak temperature, the amount of area below the temperature curve, the shape of the temperature curve, or any combination may be analyzed to determine if the termination is defective.

The use of thermal data and analysis to monitor the termination of wires or conductors has other uses beyond just crimp and heat shrink related applications. For example, thermal analysis of welds (ultrasonic, resistive, etc.), molding, stamping, thermoplastic welding and heat staking (plastic riveting) is beneficial to determine if a proper connection has been secured. In addition to collecting thermal data directly after the termination has occurred to determine if a proper termination has been affected, the thermal sensors may be used to collect thermal data during the termination process, allowing the controller to continue the termination process until such time that a good termination/connection is achieved.

By collecting thermal data during the termination process, either by non-contact methods such as thermal sensors or by direct contact thermal sensors or both the data can be used to provide a quality assessment without the need for destructive testing. The use of the thermal data is beneficial in many applications, particularly in applications in which there is very little force variation between terminating a terminal with a wire or terminating one without a wire, for example, when terminating aluminum wire.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed:

1. A method of determining the quality of a termination of a terminal to a wire, the method comprising:

positioning the terminal in a wire termination zone of a wire termination apparatus;

positioning the wire in the wire termination zone of the wire termination apparatus;

terminating the terminal to the wire;

monitoring the thermal data of the termination of the terminal to the wire with one or more thermal sensors;

comparing the monitored thermal data to stored thermal data to determine if the termination of the terminal to the wire is defective;

whereby if the termination of the terminal to the wire is defective, the wire is discarded.

2. The method as recited in claim 1, wherein the termination of the terminal to the wire is a crimp termination.

3. The method as recited in claim 1, wherein the termination of the terminal to the wire is an ultrasonic weld termination.

4. The method as recited in claim 1, wherein the termination of the terminal to the wire is a resistive weld termination.

5. The method as recited in claim 1, wherein the termination of the terminal to the wire is a solder termination.

6. The method as recited in claim 1, wherein the termination of the terminal to the wire is heat shrink termination.

7. The method as recited in claim 1, wherein the one or more thermal sensors monitor the thermal data of the termination of the terminal to the wire at a defined time.

8. The method as recited in claim 1, wherein the one or more thermal sensors monitor the thermal data of the termination of the terminal to the wire continuously over a defined interval.

9. The method as recited in claim 1, comprising: monitoring visual data of the termination of the terminal to the wire with one or more visual sensors.

10. The method as recited in claim 1, comprising:

monitoring other data of the termination of the terminal to the wire in the termination zone;

comparing the other data and the thermal data to stored data to determine if the termination of the terminal to the wire is defective.

11. The method as recited in claim 1, wherein at least one of the one or more thermal sensors monitors the thermal data of the termination of the terminal to the wire which is reflected from the termination of the terminal to the wire.

12. The method as recited in claim 1, wherein at least one of the one or more thermal sensors monitors the thermal data of the termination of the terminal to the wire through the thermal properties transferred through the wire.

13. The method as recited in claim 1, wherein the one or more thermal sensors are positioned on the wire termination apparatus.

14. The method as recited in claim 13, wherein the one or more thermal sensors are spaced from the wire termination zone of the wire termination apparatus.

15. The method as recited in claim 1, wherein the one or more thermal sensors are positioned remote from the wire termination apparatus.

16. The method as recited in claim 15, wherein the one or more thermal sensors are positioned on a wearable device.

17. The method as recited in claim 16, wherein a positioning device is provided on the wearable device, whereby the positioning device provides guidance as to the proper positioning of the one or more thermal sensors relative the wire termination zone of the wire termination apparatus.

18. A wire termination system which allows for determining the quality of a termination of a terminal to a wire, the wire termination system comprising:

a wire termination apparatus with a wire termination zone;

a thermal sensor positioned proximate the wire termination zone, the thermal sensor positioned to acquire thermal data of the termination of the terminal to the wire;

wherein the thermal sensor monitors the thermal data of the termination of the terminal to the wire to determine if the termination of the terminal to the wire is defective.

19. The wire termination system as recited in claim 18, wherein the wire termination apparatus is a hand-held wire termination apparatus.

20. The wire termination system as recited in claim 19, wherein the thermal sensor is positioned on the hand-held wire termination apparatus proximate the wire termination zone.

21. The wire termination system as recited in claim 20, wherein the thermal sensor is removably mounted to the hand-held wire termination apparatus.

22. The wire termination system as recited in claim 18, wherein the thermal sensor is positioned on a sensing device which is remote from the hand-held wire termination apparatus.

23. The wire termination system as recited in claim 22, wherein the sensing device is a wearable device.

24. The wire termination system as recited in claim 23, wherein the sensing device has a positioning device which indicates when the thermal sensor is positioned to have a field of view of the wire termination zone.

* * * * *